March 7, 1939.  N. W. LYON  2,149,399
BOTTLE HOODING MACHINE
Filed Jan. 14, 1937  2 Sheets-Sheet 1
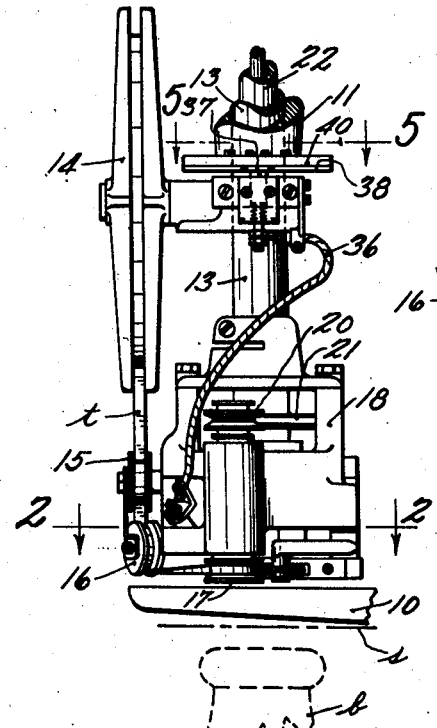
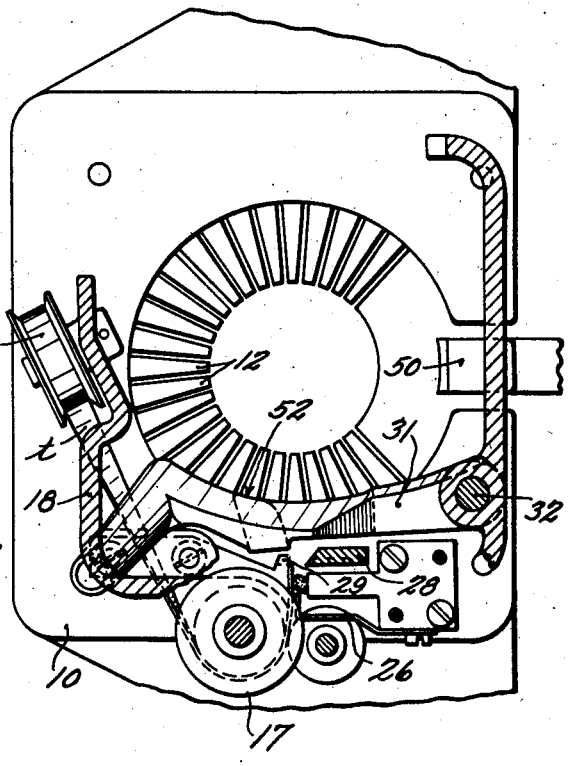
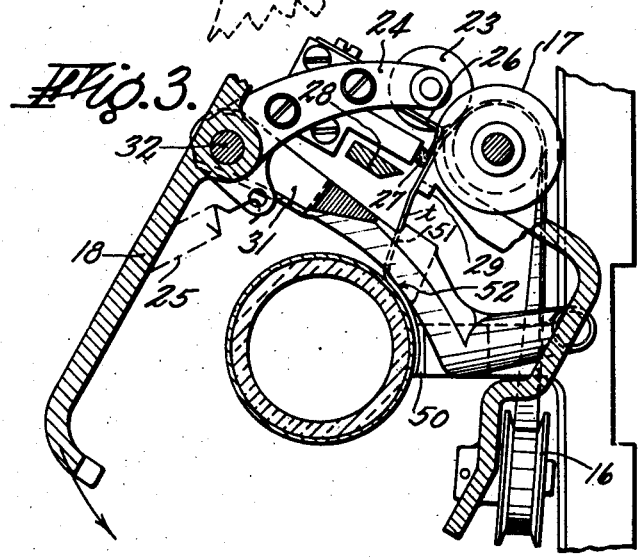
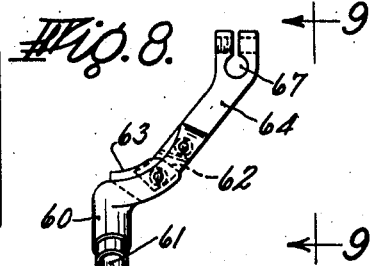
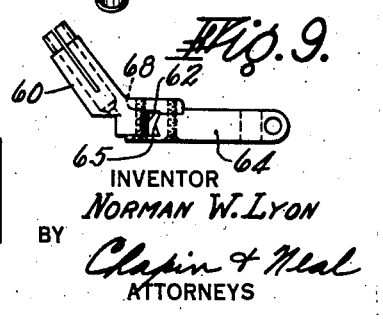
INVENTOR
NORMAN W. LYON
BY Chapin & Neal
ATTORNEYS March 7, 1939.  N. W. LYON  2,149,399
BOTTLE HOODING MACHINE
Filed Jan. 14, 1937    2 Sheets-Sheet 2
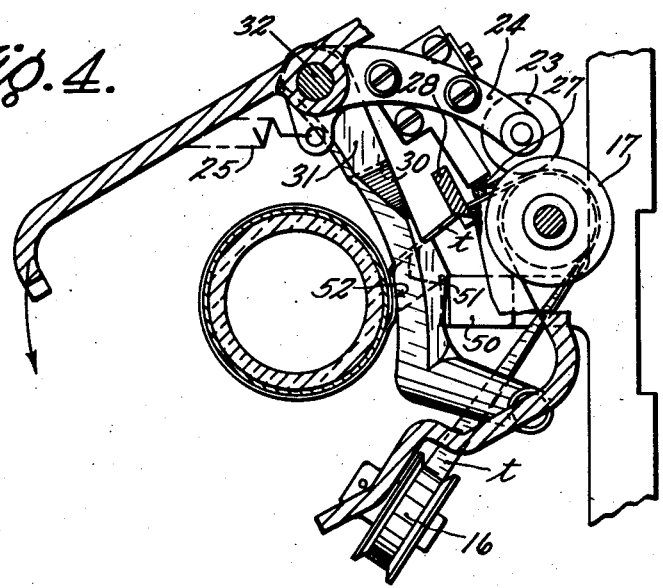
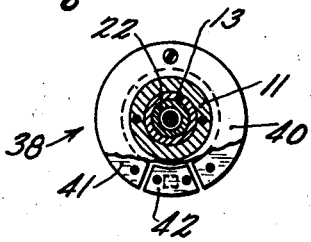
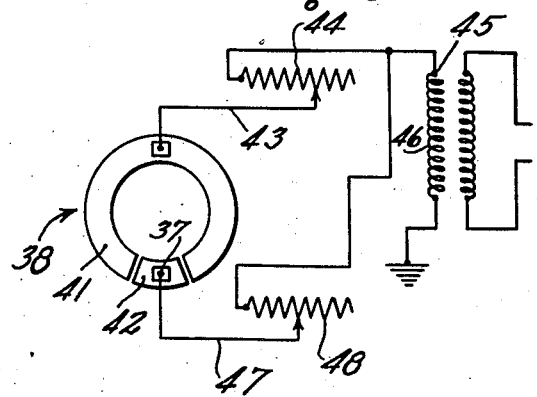
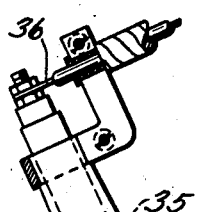
INVENTOR
NORMAN W. LYON
BY Chapin & Neal
ATTORNEYS Patented Mar. 7, 1939

2,149,399

UNITED STATES PATENT OFFICE 2,149,399

BOTTLE HOODING MACHINE

Norman W. Lyon, Springfield, Mass., assignor to Package Machinery Company, Springfield, Mass., a corporation of Massachusetts Application January 14, 1937, Serial No. 120,513

8 Claims. (Cl. 226—83)

The present invention relates to bottle hooding machines, and in particular to the heat sealing of tape around the constricted part of a previously applied hood. While the invention in some aspects is of general application, it is in other aspects an improvement on the bottle hooding machine shown in my prior patent application Serial No. 62,818, February 7, 1936. Much of the apparatus for applying the hood to the bottle and for drawing the tape into position around the hood is the same as in said prior application, and a description thereof has been omitted from the present case to confine its disclosure to the invention herein claimed. For details of the remaining mechanism the prior application may be consulted.

One object of the invention is to seal the tape progressively to the hood as it is being laid upon the hood around its circumference. A further object is to preheat the tape after it has been drawn from its supply and before it reaches the hood so that when it finally contacts the hood it may be in the best condition to adhere firmly thereto. A further object is to provide mechanism whereby overheating of the tape preheating and applying mechanism may be avoided when the operation is interrupted either during the normal course of the machine cycle or when the machine is stopped temporarily for some other reason. A further object is to provide mechanism which will maintain the temperature of the tape preheating and applying mechanism at the correct point irrespective of whether the machine is in operation or is temporarily stopped. A further object is to prevent excess transfer of heat from the tape applying means to its support, with the consequent overheating of the latter and wastage of energy used for heating. Additional objects will appear from the following description and claims.

Referring to the drawings,

Fig. 1 is a fragmentary side elevation of a machine to which the present invention has been applied;

Fig. 2 is a section, on a larger scale, taken substantially on line 2—2 of Fig. 1 with some parts broken away;

Fig. 3 is a section, on the same scale as Fig. 2, with some parts broken away in Fig. 2 restored and with other parts below the section line omitted, the parts being also shown in a different position of operation;

Fig. 4 is a view similar to Fig. 3 but with the parts in a still different position of operation;

Fig. 5 is a detail section on line 5—5 of Fig. 1;

Fig. 6 is a diagrammatic view of the heat control;

Fig. 7 is a detail of the tape preheating and applying device;

Fig. 8 is a plan view of a modification of the tape applying device;

Fig. 9 is a side view thereof, taken on line 9—9 of Fig. 8; and

Fig. 10 is a detail of the top portion of the hooded bottle.

The machine is supported upon a frame, a fragment of which is shown at 10, and which carries a support 11 for those rotating parts which apply the securing tape to the hood. The hood sheet s is fed into the position shown in Fig. 1 by any suitable mechanism, such for example as that shown in my application referred to, and is picked up by the vertically moving bottle b and carried through a circumferential series of flexible fingers 12 (Fig. 2) which drape it around the neck of the bottle. The elevated bottle is held stationary with the hood draped around it while the tape is wrapped around the hood and sealed thereon.

The tape applying mechanism will not be described in all its detail since it is completely illustrated in the application referred to except for the features of distinction to be set forth below. A sleeve 13 is periodically rotated within the support 11 and carries thereon a tape reel 14 as well as the actual tape applying devices. The tape t is led from the reel 14 over guide rolls 15 and 16 to a feed roll 17, all of which are suitably journaled on a bracket 18 on the sleeve 13. The feed roll 17 is driven by a friction roll 20 on a common shaft therewith, the friction roll contacting a segment 21 in a cam shaft 22 running within the sleeve 13 and driven at a differential speed with respect thereto. A press roll 23 is mounted on an arm 24 pivoted to the bracket 18 and connected therewith by a spring 25 so that the press roll will at all times hold the tape yieldingly against the feed roll 17. A stripper blade 26 guides the tape emerging from the bite of the feed and presser rolls, and a felt 27, which in the application referred to served to supply a sealing liquid to the tape to render it adhesive, is in the present instance utilized to further guide the tape and to strip it from the movable knife blade. It can be used to supply a sealing liquid assisting in the heat sealing of the tape if this be desired. When the desired length of tape has been fed by the feed roll, as determined by the length of the friction segment 21, it is severed by cutter blades 28 and 29 acting as in the prior application.

From the stationary cutter 29 the tape passes through an aperture or slot 30 in an arm 31 pivoted at 32 to the bracket 18. In the present instance this arm is heated so as to seal the tape by a heating cartridge 35 (Fig. 7) having one side grounded on the bracket and the other connected to a wire 36. The other end of this wire extends to a contact member 37 best shown in Fig. 1 which rests against a commutator generically indicated at 38. The details of this commutator are shown in Fig. 5, and the electrical connections in Fig. 6. The commutator is supported on a circular fiber piece 40 secured by suitable screws to the support 11, and which acts as an insulating base holding the commutator out of electrical contact with the support and the several segments of the commutator out of electrical contact with each other.

The commutator proper is composed of two segmental contactors 41 and 42, the contactor 41 making up the bulk of the circumference. This larger contactor is connected by a wire 43 to an adjustable resister 44 connected to one terminal of the secondary of a transformer 46, the other terminal being grounded on the frame of the machine. The segment 42 is connected by a wire 47 with an adjustable resister 48 also connected with the terminal 45. As is fully pointed out in the prior application referred to, the sleeve 13 and the parts carried by it make two revolutions during every cycle of operation of the machine. In the same time the cam shaft 22 makes a single revolution. The commutator is so set that when the machine comes to rest the contact member 37 rests on the smaller segment 42. The resister 48 is so adjusted that with no heat being drawn from the arm 31 by contact with the bottle neck the arm is kept at the proper temperature. The setting of the resister 44 is such as to supply a greater current, sufficient to supply enough extra heat to the arm to make up for that taken away by conduction. Depending upon the speed of machine, the resisters 44 and 48 are set so that from 1½ to 2½ times as much energy is supplied to the heater cartridge when the machine is running than when it is stationary. This arrangement is preferable to one in which the current is cut off during the stoppage of the machine on account of the fact that the latter arrangement would permit the arm 31 to cool off too much.

The operation of the device will now be considered more in detail. When the tape has been cut off and the tape-applying head is at rest the parts are in the positions shown in Fig. 2. The arm 31 has been withdrawn from contact with the bottle by mechanism fully described in the application referred to, the tape feeding roll 17 is at rest, and the current through the heating cartridge has been cut down to a point where the temperature in the arm 31 will remain at the proper point with no heat being withdrawn from the arm except that which is dissipated into the air. When a hood has been applied to a new bottle by elevation of the latter through the pleating fingers 12, rotation of the roll 17 is started by relative motion between the sleeve and the cam shaft. It will be remembered that the roll 17 and the arm 31 rotate together about the bottle. The leading end of the tape will be projected through the aperture 30 (Fig. 7) in the arm 31, and will be preliminarily heated by contact with the wall of this aperture. By the time the tape contacts the hood the tape end will have come about into line with one edge of the presser member 50, and as the parts move past this presser it is brought into contact with the hood by mechanism fully described in the aforesaid application.

The condition of the parts is now shown in Fig. 3, in which the arm 31 has just passed the presser 50 and the latter has come into contact with the tape to prevent the end of the latter first applied to the hood from coming loose as the remainder is being wound on. It will be apparent from Fig. 3 that the tape passes against the wall 51 of the aperture 30 and then over the flat side 52 of the arm 31. The whole arm being heated the tape is thus given a preliminary heating before contacting the hood, and is then pressed against the hood while it is being further heated. The result is that when a proper heat-sealing tape is used a very tight seal is obtained. The tape is almost immediately chilled after the arm 31 has laid it upon the hood by conduction of heat away from it by the cool bottle neck, so that there is no danger of the tape pulling away once it has been put in place.

The operation continues as described until the position of Fig. 4 is approached, at which time the presser 50 is retracted to permit the arm 31 to pass. At about the same time the cutter 28 is actuated to sever the tape, and the arm 31 continues to revolve around the bottle until the position of Fig. 2 is reached, gradually receding from the bottle after the trailing end of the tape is pressed in place. At this time the contact member 37 is again on the segment 42, and during the time the tape applying mechanism is inactive only enough heat is supplied to the heating cartridge to keep the arm 31 at the proper temperature.

In Figs. 8 and 9 a modified form of tape applying arm is shown which has numerous advantages, especially when the machine is to be operated at high speed, and also having advantages for heat sealing machines of other types. The arm is here made in two parts, a part 60 having a recess 61 adapted to receive the electrical heating cartridge and also shaped to provide a preliminary tape heating surface 62 and an applying surface 63; and a part 64 having an initial tape guiding surface 65, preferably angular, and a clamping opening 67 by which it may be secured to the shaft 32. The part 60 is preferably made of a highly conducting alloy, such as one comprising 88–90% copper and 10–12% zinc; while the part 64 is preferably made of an alloy of low conductivity such as Monel metal. The ratio of conductivities of these two alloys is approximately 7 to 1. The two sections are shown as being secured together by screws 68, but their abutting surfaces are preferably brazed together, the screws holding them merely during assembly.

This modified construction has both mechanical and thermal advantages. Due to the fabrication of the arm in two pieces the aperture through which the tape passes is easier to machine. Also, by reason of this greater ease in machining the size of the aperture can be reduced while preserving the sticky side of the tape from adhesion to the walls of the aperture. This results in confining the tape in a small heated space and facilitates its heating. Turning to the thermal advantages, the use of greater wattage in the heating cartridge is made possible without danger of overheating the cartridge, since the heat is conducted away from it very rapidly. At the same time the rapidity of conduction of heat beyond the effective tape heating point is decreased, and the wastage of heat both by conduction to the point of support and by radiation due to the high temperature of the member as a whole is reduced. The two-part construction insures a concentration of heat at the point where the member contacts the tape with a minimum of wastage of heat beyond this point.

I claim:

1. A device for applying a binding tape to a hood on the neck of a bottle comprising means for preheating the tape progressively and heated means for applying the preheated tape circumferentially around the hood.

2. A device for applying a binding tape to a hood on the neck of a bottle comprising means for preheating the tape progressively and means for applying the tape circumferentially around the hood and for heating the tape to a sealing temperature during its application.

3. A device for applying a binding tape to a hood on the neck of a bottle comprising a member rotatable around the bottle neck for applying a tape to a hood thereon, means for guiding tape to said member, said member being shaped to contact the tape both before and after its initial point of contact with the hood, and means for heating said member.

4. A device for applying a binding tape to a hood on the neck of a bottle comprising intermittently operable means for applying the tape circumferentially around the hood, means for heating the tape to a sealing temperature during its application, and means for decreasing the supply of heat to the heating means during the periods of interruption.

5. A device for applying a binding tape to a hood on a neck of a bottle comprising intermittently operable means for applying the tape circumferentially around the hood, including a tape contacting member, an electrical heating element positioned for heating said member, a circuit for supplying electrical energy to the heating element, and means for imposing additional resistance in said circuit in the periods of rest of said intermittently operable means.

6. A device for applying a binding tape to a hood on the neck of a bottle which comprises a support, a member intermittently rotatable upon said support around the axis of a bottle, means carried by said member for heating said tape and applying it to a hood on the neck of a bottle, a circuit for supplying electrical energy to the heating means for heating the same, a commutator and a contact member one carried by the support and one by the rotatable member and included in said circuit, said commutator having an insulated segment positioned so as to contact the contact member when the intermittently rotatable member is stationary, and a resistance connected to said segment so as to be included in the circuit when the intermittently rotatable member is stationary so as to decrease the electrical energy supplied to the heating means during the periods of rest of said intermittently rotatable member.

7. A device for applying a binding tape to a hood on the neck of a bottle comprising a member rotatable around the bottle neck for applying a tape to a hood thereon, the member being constructed with a supporting portion made of metal of low thermal conductivity and with a second portion including at least a portion of the surface of said member in contact with the tape made of metal of high thermal conductivity, means for supplying heat to said portion of high thermal conductivity, and means for supporting the portion of low thermal conductivity and rotating the member around the bottle neck.

8. A device for applying a binding tape to a hood on the neck of a bottle comprising a member rotatable around the bottle neck for applying a tape to a hood thereon, the member being constructed with a supporting portion made of metal of low thermal conductivity and with a second portion including at least a portion of the surface of said member in contact with the tape made of metal of high thermal conductivity, said portions being formed at their zone of junction with a narrow tape receiving slot, means for supplying heat to the portion of high thermal conductivity, means for supporting the portion of low thermal conductivity and rotating the member around the bottle neck, and means for feeding tape through said slot with the non-adhesive side of the tape in contact with the portion of the member of high thermal conductivity.

NORMAN W. LYON.